United States Patent Office 3,642,623
Patented Feb. 15, 1972

3,642,623
OIL BASE WELL DRILLING FLUID COMPOSITION AND METHOD
Robert B. Bennett and Warren C. McMordie, Jr., Houston, Tex., assignors to Oil Base, Inc., Houston, Tex.
No Drawing. Filed Oct. 10, 1969, Ser. No. 865,492
Int. Cl. C09k 3/00; B01f 17/42
U.S. Cl. 252—8.5 M
19 Claims

ABSTRACT OF THE DISCLOSURE

Stabilization of oil continuous phase well fluids, particularly oil base drilling fluids, against contamination with water-soluble alkaline earth salts, e.g., calcium chloride, is accomplished by addition of a novel additive system comprising a water-soluble acid-blocked alkanolamide nonionic surfactant, a sulfonated acid anionic surfactant and an oil-soluble nonionic ethoxylated alkyl phenol. The additive system controls the water wettable solids in an oil base well fluid system in the presence of alkaline earth salts for extended periods at high temperature keeping such solids in the oil-wet state.

BACKGROUND OF THE INVENTION

The instant invention relates to a novel oil base drilling fluid which maintains emulsion integrity, a dispersed oil-wet solids condition, and the proper viscosity and gel strength under adverse downhole conditions. More particularly, the instant invention relates to a novel additive system for use with oil continuous-phase drilling fluids to prevent fluid breakdown particularly at high temperatures of 200° F. or more caused by introduction of contaminants.

The water-soluble alkaline earth salts such as calcium chloride, magnesium chloride and the like cause difficult problems in maintaining mud stability at high temperatures. The novel additive system of this invention is particularly directed to providing a stable oil-wet solids condition in the presence of such salts at elevated temperatures, especially when these salts reach a concentration of over 25,000 parts per million $CaCl_2$ or the equivalent of such concentrations with other salts.

The term "oil base drilling fluid" or "oil base mud" is applied to a special type of drilling fluid where oil is the continuous phase and water, if any is present, is the dispersed phase. Oil base muds contain blown asphalt and usually a small amount of water emulsified into the system with caustic or lime and emulsifying agents. Oil base muds are differentiated from invert-emulsion muds in the amount of water which may be employed, the method of controlling viscosity and thixotropic properties, the composition of the filter cake and the nature of lost fluid which might contaminate the formation.

Whereas invert emulsions have a continuous oil phase and contain substantial amounts of oil to form a water-in-oil emulsion, oil base muds generally contain lower amounts of water and are effective as drilling fluids even when waterless. On the other hand, invert emulsions require the presence of some water as an emulsified or dispersed phase and utilize chemistry dependent upon the existence of such emulsion. Such muds are well known in the art.

It is essential in oil continuous phase drilling fluids, i.e., oil base fluids and inverts, that the dispersed solids, i.e., the weighting solids, clays, shale and cuttings, be dispersed in an oil-wet condition and that the aqueous phase be dispersed as a discontinuous phase in the oil. Such materials are typically water wettable, and in the presence of oil and water will preferentially exist in the water-wet state. The development of the emulsion and the hydrophobic condition of dispersed solids has been accomplished by the addition of suitable emulsifying agents which are well known in the art. However, under conditions of use, such a drilling fluid can become contaminated with the water phase of salts which tend to adversely affect the stability of the emulsion and the hydrophobic condition of the weighting agents.

Although oil continuous-phase drilling fluids appear to be capable of tolerating the introduction of sodium salt such as sodium chloride by treatment of emulsifiers known in the art, substantial contamination of an oil continuous-phase drilling fluid with a water-soluble alkaline earth salt such as calcium chloride tends to result in fluid breakdown, particularly at high temperatures and pressures which would be encountered in a deep hole. The adverse effects of such water-soluble salts are particularly unusual since insoluble calcium compounds in the form of lime are typically added to oil base fluids as a standard ingredient in their formulation.

Water soluble alkaline earth salt contamination most often results from contamination with calcium salts, usually calcium chloride. Hence herein reference will be made primarily to calcium salt contamination, it being understood that stabilization against other alkaline earth salts is equally contemplated by this invention. Sometimes calcium salt contamination is purposefully added to the oil base fluids. Techniques which have been recently developed to control swelling of shale in the formation proximate the borehole involve the treatment of oil continuous-phase drilling fluids with a water-soluble calcium salt in order to alter the "water activity" of the aqueous phase of the oil base fluid. These shale-control techniques require at times the addition of such calcium salts in response to properties of the formation being drilled. Under such circumstances, it becomes necessary to stabilize the drilling fluid against fluid breakdown resulting from the addition of such water-soluble calcium salts.

On the whole, emulsifying agents which have been previously utilized in the art to stabilize oil continuous-phase drilling fluids from aqueous contamination, lignosulfonate contamination, and the like have been largely ineffective to impart more than temporary stabilization when calcium ion contamination, e.g., contamination with calcium chloride, is encountered in the aqueous phase. Although other emulsifiers might result in a restoration of fluid properties and mud rheology temporarily, it has been found that after prolonged conditions of use, particularly at high temperatures as would be encountered in deep wells, the addition of such calcium salts results in recurrent breakdown of the desirable fluid properties.

The necessity of maintaining solids in an oil base mud in a hydrophobic or oil-wet condition is constantly a problem due to water contamination, contamination of hydrophilic clays, lignosulfonate contamination and salt contamination, the problem may become especially acute when the oil base mud is exposed to calcium salts. The salts act either chemically or electrostatically on the standard ingredients of an oil base mud system mitigate against the integrity of the oil base mud particularly under conditions of high temperature and pressure.

SUMMARY OF THE INVENTION

It is accordingly an object of this invention to provide an additive to preserve the integrity of oil continuous-phase fluids under contaminating conditions which might be encountered in drilling a well.

It is among the further objects of this invention to provide a method for treating an oil continuous-phase drilling fluid to permit its treatment with water-soluble calcium salts in accordance with newly developed techniques for affecting the water activity of the mud to control shale swelling proximate the borehole.

It is a further object of this invention to provide a method for treating an oil continuous-phase drilling fluid preparatory to use in a high temperature enviroment where contact with contaminants including water-soluble alkaline earth salts is contemplated to minimize the adverse effects of such contact and to maintain the mud solids in an oil-wet and dispersed condition.

It is among the further objects of this invention to provide a method for post-treating an oil continuous-phase fluid after contamination with water-soluble calcium salts.

It is a further object of this invention to provide a novel additive system for use particularly with oil base muds that is effective to prevent loss of fluid properties resulting from a variety of contaminants including calcium salts, thus reducing the number and variety of emulsifiers which need be introduced into oil being drilling fluids.

It is a further object of this invention to provide a method for stabilizing a variety of oil base well fluids from loss of rheological properties at high temperatures when contaminated with calcium salts to enable such fluids to be readily used in applications other than the initial drilling operation, e.g., for spotting around stuck drill pipe, or for workover or completion operations.

It is among the further objects of this invention to provide a novel additive system for treatment of oil base fluids to prevent adverse effects caused by contaminations as described above, which treatment is thoroughly compatible with the oil base system and other standard additives of such system so that post-treating of a previously formulated oil base system can be accomplished without adversely affecting fluid properties.

These and other objects of the instant invention will be apparent in view of the ensuing specification and claims.

The instant invention provides an additive system which successfully stabilizes the well fluids, including oil base drilling fluids and invert emulsions, from a variety of contamination for prolonged periods under adverse conditions, and in particular from contamination with calcium salts, which additive system includes a water-soluble portion comprising a modified alkanolamide nonionic surfactant and a long chain anionic surfactant, e.g., a long chain sulfonated acid or sulfated alcohol and oil-soluble portion comprising an ethoxylated alkyl phenol.

It has been found that to successfully stabilize oil base well fluids against loss of emulsion integrity, viscosity, and rheological properties under conditions of water-soluble calcium salt contamination at high temperatures and pressures which might be encountered downhole, these elements must be present in combination. Preferably, the additive system is used in amounts of from about four to as much as twenty-five pounds per barrel when added to an oil base fluid or an invert. However, it will be appreciated that in post-treating an already formulated fluid upon encountering a clacium salt containing formation, lesser amounts of this additive system may be sufficient to restore the fluid integrity.

The additive system of this invention comprises from about 25 to 85 percent by weight of the water-soluble portion, i.e., the alkanolamide and the anionic acid or alcohol, and from about 15 to about 75 percent by weight oil-soluble portion comprising the ethoxylated alkyl phenol. Preferably, particularly in higher density muds, the proportions include more water-soluble components, i.e., about 40 to 85 percent with 15 to 60 percent by weight of the water-insoluble portion. In pretreatment of oil base drilling fluids, it is convenient to utilize a balanced blend of about 40 to about 60 percent water-soluble components and 40 to 60 percent of the oil-soluble, water-insoluble phenol component. Subsequent additions of only the water-soluble components then can be effective to restore fluid properties to such a pretreated fluid when substantial contamination by calcium salts begins to have adverse effect upon the fluid properties of the fluid. Treatment with only the water-soluble components of the additive system is usually effective when sufficient oil-soluble alkyl phenol remains present to provide at least about 15% by weight of the total additive system. This superior stabilization is obtained by the co-presence of all of the elements of the novel additive system of this invention.

DESCRIPTION OF THE PREFERRED EMBODIMENTS

The particular preferred aspect of this invention provides for use of this novel additive in oil base drilling fluids, though it shall be understood that the additive is useful in inverts as well.

A variety of emulsifying agents has been employed to stabilize oil base drilling fluids against aqueous contamination, salt water contamination, hydrophilic clay contamination, and lignosulfonate contamination, the latter usually resulting from changeover from a water base lignosulfonate mud to an oil base mud. Other chemicals are utilized in oil base drilling fluids to regulate gel strength, plastering properties, and the like.

However, these additives, conventionally present in oil base well fluids, have not shown themselves capable of stabilizing the fluid against contamination with calcium salts such as calcium chloride. Consequently, the additive system of this invention is contemplated for use in addition to other additives which might be present in oil base drilling fluids, and is not designed to replace all such additives. It has been found that the novel additive system of the instant invention is effective to stabilize oil base drilling fluids against aqueous or salt water contamination and to impart stability when the mud is contaminated by lignosulfonate. Accordingly, the novel additive system of this invention may be used for such purposes also if desired.

The novel additive system of this invention comprises a mixture of two nonionic surfactants, one of which is oil-soluble, the other of which is water-soluble.

The oil-soluble component of the additive system of the instant invention comprises an oil-soluble, ethoxylated phenol which corresponds to the general formula:

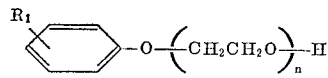

wherein $R^1$ is alkyl, typically an alkyl group of from about 6 to about 16 carbon atoms and where $n$ indicates the number of repeating ethyleneoxy groups pendent on the phenyl radical. The number of ethyleneoxy groups pendent from the phenyl radical is insufficient to render the compound water-soluble. Effective results have been obtained with alkyl phenols wherein $n$ has an average value of from about 1 to about 2. Accordingly, as the water-insoluble element of the novel additive system of this invention, there may be employed mixtures of monoethoxylated, diethoxylated, and triethoxylated alkyl phenols or sesquiethoxylated alkyl phenols wherein the overall degree of ethoxylation is insufficient to render the compounds water soluble, and preferably wherein the degree of average ethoxylation is from about 1 to about 2 ethoxy units per molecule.

Highly preferred are the monoethoxylated and diethoxylated octyl and nonyl phenols and mixtures thereof. For example a mixture of two parts by weight of a monoethoxylated octyl or nonyl phenol with one part by weight of a monoethoxylated octyl or nonyl phenol may be used.

The ethoxylated alkyl phenols used in the additive system of this invention are oil-soluble, and hence are readily compatible with the oil base well fluids of this invention. These compounds are well known in the art and are available from commercial sources.

The water-soluble portion of the instant novel additive system comprises a modified alkanolamide and a sulfated or sulfonated anionic surfactant.

The alkanolamide compounds are water-soluble and possess unusual solubility and surface activity in aqueous solution in the presence of alkaline salts. In addition to demonstrating excellent water solubility and solubility in alkaline solutions, the alkanolamide condensation products utilized in the additive systems of this invention are also soluble in aqueous acidic solutions and in solutions of various salts. These modified alkanolamides exhibit a lower viscosity in water solution than do alkali metal soaps, and other detergent types such as alkylene oxide adducts, alkyl aryl sulfonates and the like.

Modified alkanolamides used in this invention are prepared by condensing a mononuclear aromatic polybasic acid with a fatty acid alkanolamide prepared from an alkanolamide and a long chain aliphatic monocarboxylic acid to produce a condensation product soluble in aqueous as well as alkaline and acidic solutions.

The molar ratios of the ingredients utilized in manufacturing the alkanolamide condensation products used in the water soluble portion of the instant novel additive system preferably provide from two to three moles of the aromatic polybasic acid for each mole of long chain monocarboxylic acid. The alkanolamine is condenced with these two acids in amounts so as to provide the residual condensation products with an appreciable content of uncondensed carboxyl groups from the aromatic polybasic acid.

Usually, when for example a dialkanolamine is employed, as is preferred, the amount of dialkanolamine should not exceed from about 1 to about 1.5 moles per carboxylic acid equivalent on the long chain monocarboxylic acid and the aromatic polycarboxylic acid.

It has been found that it is particularly preferred for a dialkanolamine to be present in amounts of about 1.2 moles for each carboxylic acid equivalent.

The condensation reaction to prepare the alkanolamide product is preferably carried out as well known in the art under conditions of elevated temperatures, i.e., about 180° F. to about 400° F. under atmospheric pressure with agitation of the reaction mixture. Condensation catalysts as also recognized in the art, particularly alkalies or alkaline materials can be used as catalysts but are not necessary to carry out the reaction. Reaction time is generally run on the order of two to five hours to produce the desired condensation product.

The long chain monocarboxylic acid constituent of the modified alkanolamide may be supplied in various forms, for instance, as the free acid or as the ester of a free acid, typically the methyl ester. In addition, glyceride esters such as the triglyceride ester of the monocarboxylic acid may also be used. The long chain monocarboxylic acid may contain from about 8 to as many as about 24 carbon atoms, but usually contains from about 8 to about 18 carbon atoms. Preferred condensation products used for detergent purposes contain approximately 12 to 14 carbon atoms and include monocarboxylic acid such as caprylic acid, pelargonic acid, lauric acid, myristic acid, palmitic acid, oleic acid, linoleic acid, the tall oil fatty acids, stearic acid, and the tallow fatty acids. Mixtures of acids may also be employed as will be understood by those skilled in the art.

Various aromatic polybasic acid constituents can be used to modify the alkanolamide constituent of the instant novel additive systems. Advantageously, such acids as phthalic anhydride can be used. In addition, isophthalic acid, terephthalic acid, mellitic acid, and other similar acids which do not affect the water solubility of the condensation products may be used. The acids may contain suitable substituents which also do not affect water solubility such as hydroxyl groups or sulfonic groups. It will be noted that all the foregoing acids are mononuclear in structure, and it will be appreciated that mixtures of such acids may be used. Phthalic anhydride is particularly preferred as the polybasic acid constituent in the ankanolamide constituents of the additive systems of this invention.

The alkanolamine constituent of the condensation products of this invention is most preferably diethanolamine which may be used in its commercial form. In such a state, the diethanolamine may contain small or minor proportions of other alkanolamines or small amounts of other alkanolamines can be added to dialkanolamine in the manufacture of the condensation products. These other alkanolamines would include, for example, monoethanolamine, monoisopropanolamine, diisopropanolamine, diethylethanolamine, and the glycerolamines. Preferably, the content of such other alkanolamines does not exceed about ten percent by weight of the alkanolamine constituent used.

A highly preferred additive system in accordance with this invention combines a monoethoxylated octyl or nonyl phenol with a phthalic acid modified amide produced from ethanolamine and coco ($C_{18}$) acid.

The second constituent of the water-soluble portion of this invention is a long chain, water-soluble, anionic surfactant, preferably a sulfonated fatty acid or a sulfated fatty alcohol. Such surface-active agents are well known in the art and comprise the sulfonated monocarboxylic acids having from about 12 to 24 carbon atoms (although these compounds are more precisely sulfated oils or acids, the term "sulfonated" is often used to describe them) and preferably exhibiting some unsaturation, and the counterpart sulfated long chain alcohols having 12 to 24 carbon atoms. Generally, these compounds are prepared by treatment of an unsaturated acid or alcohol with sulfuric acid to add a sulfate group at a double bond to yield a polyfunctional surface-active agent or soap. Typical unsaturated acids which are useful in preparation of these soaps include dodecylenic acid ($C_{12}$), palmitoleic acid ($C_{18}$), oleic acid, linoleic acid, linolenic acid ($C_{18}$), eicosenic acid ($C_{20}$), docosenic acid ($C_{22}$), and the like. The $C_{18}$ acids such as oleic acid, linoleic acid and the like are commonly available and are most preferred. For example, sulfonated castor oil (a mixture of $C_{18}$ acids) can be conveniently used. The sulfated derivatives of the corresponding alcohols, e.g., dodecylenyl alcohol, oleyl alcohol, and the like, may be used in place of the acids if desired.

The water-soluble portion of the novel additive system of this invention comprises a major proportion of the alkanolamide, typically 10 to 20 parts by weight and about 1 to about 5 parts by weight of the anionic long chain acid or alcohol. An eminently preferred combination for the water-soluble component of the additive system contains about 3 parts by weight anionic to 17 parts by weight of modified alkanolamide, that is a water-soluble portion containing about 15% by weight, based on the water soluble part, of the anionic long chain compound with the remainder being alkanolamide. These components of the water-soluble portion of the additive system are conveniently premixed in such proportions since post-treatment of a contaminated mud which was previously treated with a balanced blend additive system of this invention is often accomplished by addition of only the water-soluble portion particularly when the mud solids begin to exhibit a tendency to become water-wet.

The novel additive system of this invention is added to an oil base well fluid in small amounts sufficient to maintain fluid integrity and to stabilize the system against loss of properties due to contamination with a water-soluble calcium salt. Pretreatment of an oil base drilling fluid may be desirably accomplished by addition of the additive system of this invention in amounts corresponding to from about 2 to about 8 pounds per barrel of active stabilizing ingredients, i.e., disregarding any thinner added to the additive systems for convenience of addition. Of course, greater amounts can be provided in the drilling fluid even as a pretreatment when the particular oil base fluid being treated is contemplated for use under conditions of severe calcium contamination or high temperature.

Pretreatment can be efficiently carried out by admixing a balanced blend of about 40 to 60 percent of the two-component water-soluble portion with from about 40 to 60 percent by weight of the ethoxylated phenol oil-soluble portion. Because of the viscosity of these additives, and the combination of additives, and the water-insolubility of the alkyl phenol constituent, it is usually desirable to dilute the additive composition of this invention with suitable thinning agents such as long chain alkylene glycols, e.g., hexylene glycol and/or viscosity reducing oils such as aromatic oils as are known in the art.

Usually such thinning agents added in amounts up to about 50 percent by weight will sufficiently reduce the viscosity of the additive system of the instant invention to a stage where the additives are readily pourable and easily handled.

The novel additive system of this invention has been found to be effective when operating with as little as 15 percent to as much as 75 percent by weight of the ethoxylated phenol and from 25 up to about 85 percent by weight of the water-soluble portion. At the upper limit of 75 percent ethoxylated phenol rheological properties are marginal in a heavily weighted mud. But in less dense muds, the additive will perform acceptably at this weight ratio. Preferably, the ethoxylated phenol is used in amounts of 15 to 60 percent by weight and the water-soluble combination of alkanolamide and sulfonated compound comprises about 40 to about 85 percent by weight.

After pretreatment as disclosed above, it is often necessary to continue the addition of additives during circulation of the fluid downhole as addition of calcium salts are encountered, or as the temperature and pressure to which the fluid is subjected in the presence of calcium salts continues over long periods of time or increases as the borehole becomes deeper. Post-treatment can be effected by adding additional amounts of the entire additive system usually in amounts of 2 to about 8 pounds per barrel.

But following a balanced pretreatment with a 40 to 60 percent by weight admixture of the two components of the additive system, that post-treatment can be often effected by adding only the water-soluble constituents, as pointed out above, particularly when loss of mud rheology has resulted from an increasing proportion of water-wet solids in the mud, causing loss of rheological properties.

Treatment of oil base drilling fluids in accordance with this invention with the novel additive system herein specified is accomplished by addition of small amounts of the additive system which may range in amount from as low as two pounds per barrel and yet be sufficient to effectively maintain rheological properties and keep solids in an oil-wet state in the face of calcium salt contamination. The additives of this invention will generally not be required in amounts exceeding about 8 to 10 pounds per barrel and certainly amounts in excess of this will not generally be added as a pretreatment. But it will be understood that amounts as large as 25 pounds per barrel may be employed, specially when post-treating a severely contaminated fluid containing none of the additive system herein disclosed.

It is further understood that the novel treatment of this invention may be used in addition to other conventional additives employed with oil base drilling fluids such as alkyl aryl sulfonates, long chain fatty acids, and other anionic, cationic, nonionic or amphoteric surface-active agents which might desirably be employed in oil base drilling fluids in accordance with procedures known in the prior art. The amphoteric surface-active agents, such as disclosed in copending U.S. application No. 692,298 are useful to stabilize oil base muds against chrome lignosulfonate mud contamination.

In particular, the novel additive system of this invention functions with singular efficacy in stabilizing oil base drilling fluids, i.e., oil base drilling muds. Such oil base drilling muds are well known to the art and contain blown asphalt, hydrate of lime, a gel-producing agent such as calcium naphthenate or the like, an additive for improving viscosity and plastering such as stearic acid, and weighting materials such as barite. Although other additives such as the sulfonates and amphoteric additives mentioned above may be used with the novel additive system of this invention, the additive system herein does provide stabilization against water contamination, brine contamination, lignosulfonate mud contamination and alkaline earth salt contamination when added to a mud prepared in this known manner. Typically, oil base drilling fluids also are prepared containing a small percentage of water, up to about 15 percent and can tolerate much more if contaminated. However, unlike invert emulsion fluids, an oil base drilling fluid may function and maintain its rheological properties although waterless.

The novel additive system of this invention is also effective to stabilize other oil base fluids, other than drilling fluids, such as packer fluids or annular fluids in packs, perforating fluids or spotting fluids to release stuck drill pipe. The integrity of maintaining a water-in-oil emulsion in the event of water contamination and calcium salt contamination in such fluids is essential to their proper functioning, and hence the additives of this invention can be used for these varied fluids as well.

It will be appreciated by those skilled in the art that the instant invention broadly provides an additive system and a method for treating an oil base well fluid to maintain its integrity in the presence of calcium salts even under extremely adverse contaminating conditions. The specific compounds which may be used in the additive system, particularly to provide the water-soluble alkanolamide component of the system, will vary in accordance with the reactants selected for preparation of the compound. For example, as indicated above, if the ethanolamine employed to produce the modified alkanolamide is a commercial grade chemical, the resulting alkanolamide will be a mixture of products corresponding with the varied starting materials and impurities present with the ethanol used.

It should also be understood that mixtures of modified alkanolamides, mixtures of sulfonated acids and alcohols and mixtures of ethoxylated alkyl phenols as prescribed can be used to satisfy the function of each of the constituents of the novel additive system of this invention.

The following examples are illustrative:

EXAMPLES

Drilling mud samples used in the following examples were prepared by admixing 100 grams of an asphalt cutback, consisting of 60 grams of blown asphalt and 40 grams of diesel oil, with 11 grams of lime, 1 gram of naphthenic acid and 3.5 grams of stearic acid. Five percent by volume water was then blended with the mixture, and diesel oil in an amount of about 240 ccs. was added to form one standard laboratory barrel of unweighted oil base drilling fluid.

Drilling fluid weighted to the desired density in pounds per gallon is prepared from the standard unweighted fluid by adding barite and blending the mixture. Typically, some additional diesel oil is required to be added when with the barite. For example, to prepare an 18 lb./gal. mud, 85 parts of unweighted mud as above are admixed with 15 parts diesel oil prior to barite addition.

EXAMPLES 1–18

To test the efficacy of standard additives in stabilizing oil base drilling fluids against calcium salt contamination, series of 18 pounds per gallon mud samples prepared as above were treated with 6 pounds per barrel amounts of various additives and contaminated with 15 percent by volume of a saturated aqueous solution of calcium chloride. Each sample was agitated at room temperature. Since preliminary screening was all that was desired, pass or fail determinations were made on a visual basis noting if the solids had become grainy and if the aqueous and oil phases of the mud had separated.

Results are set forth in Table 1:

TABLE 1

| Ex. No. | Additive | Result |
|---|---|---|
| 1 | 6 p.p.b. petroleum sulfonate (alkyl aryl sulfonate) | FAIL |
| 2 | {4 p.p.b. petroleum sulfonate<br>{2 p.p.b. disodium-N-lauryl β-iminodipropionate | }FAIL |
| 3 | 6 p.p.b. disodium-N-lauryl β-iminodipropionate | FAIL |
| 4 | 6 p.p.b. of calcium salt dodecyl benzene sulfonate | FAIL |
| 5 | 6 p.p.b. potassium N-tallow diethoxylate-β-iminopropionate. | PASS |
| 6 | 6 p.p.b. cocoamine pentaethoxylate | FAIL |
| 7 | 6 p.p.b. cocoamine diethoxylate | PASS |
| 8 | 6 p.p.b. coco acid modified alkanolamide | FAIL |
| 9 | 6 p.p.b. nonylphenol sesquiethoxylate | FAIL |
| 10 | {3 p.p.b. nonylphenol sesquiethoxylate<br>{3 p.p.b. hydrogenated tallow amine | }FAIL |
| 11 | 6 p.p.b. tallow β-amine | FAIL |
| 12 | {3 p.p.b. disodium-N-lauryl-β-iminodipropionate<br>{3 p.p.b. nonyl phenol sesquiethoxylate | }PASS |
| 13 | {3 p.p.b. disodium-N-lauryl-β-iminodipropionate<br>{3 p.p.b. nonyl phenol nonylethoxylate | }FAIL |
| 14 | 3p.p.b. of 85:15 modified coco alkanolamide+sulfonated oleic acid. | FAIL |
| 15 | {3 p.p.b. 85:15 modified coco-alkanolamide+sulfonated oleic acid.<br>3 p.p.b. nonyl phenol sesquiethoxylate | }PASS |
| 16 | {3 p.p.b. 85:15 modified coco alkanolamide+sulfonated oleic acid,<br>1.5 p.p.b. nonyl phenol sesquiethoxylate<br>1.5 p.p.b. nonyl phenol nonylethoxylate | }FAIL |
| 17 | 6 p.p.b. N-tallow propylene diamine | FAIL |
| 18 | {3 p.p.b. cocoamine diethoxylate<br>{3p.p.b. nonylphenol sesquiethoxylate | }PASS |

Screening tests indicated that the water-insoluble nonylphenol sesquiethoxylate performed satisfactorily with a water-soluble nitrogen containing surfactant while the water-soluble nonylphenol nonylethoxylate did not perform satisfactorily.

EXAMPLES 19-20

Since screening tests indicated favorable results were obtained with a nitrogen containing surfactant and an ethoxylated alkyl phenol, the combination of a water-soluble amine (coco amine diethoxylate) was tested with a water-soluble triethoxylated nonylphenol and a monoethoxylated nonylphenol in an 18 pound per gallon mud prepared as above. Tests indicated that the water insoluble phenol combined with a water soluble amine performed satisfactorily (Example 19) while the water-soluble phenol with the same amine did not stabilize the mud against calcium chloride contamination and the mud "flipped," i.e., underwent substantial phase separation with water-wetting of solids (Example 20). Testing was carried out to determine apparent viscosity ($V_a$), plastic viscosity ($V_p$) and yield point (YP) and 10 second gel strength on a Fann Meter (Model 35) at 150° F. Electrical stability (ES) indicates the breakdown voltage of the emulsion and hence is a measure of strength of the emulsion. A stability of over at least about 400 volts is considered satisfactory. Results are shown in Table 2:

calcium chloride in water. The mud was also treated with ½ pound per barrel of nonylphenol monoethoxylate, ½ pound per barrel of cocoamine diethoxylate, and ½ pound per barrel of disodium N-lauryl-β-iminodipropionate. The latter additive is a known stabilizer for oil base drilling fluids against contamination by chrome lignosulfonate drilling fluids.

The sample was tested and the electrical stability was found to have increased to in excess of 540 volts (Example 22). After hot-rolling the sample for 16 hours at 200°, rheological properties still remained essentially the same although the electrical stability had dropped somewhat to 480 volts (Example 23).

The mud was then weighted with additional barite to 16 pounds per gallon and contaminated with 5 percent by volume of water adjusted with calcium chloride to 400,000 parts per million. This resulted in addition of the equivalent of 13 pounds of calcium chloride per barrel. The mud was treated again with 1 pound per barrel of each of the three additives used above. Testing of the mud revealed that once again the electrical stability was in excess of 540 volts. The apparent and plastic viscosities had increased primarily due to the increased density of the mud (Example 24). After hot-rolling the sample for 16 hours at 300° F., the mud was tested again at which time the electrical stability was found to have fallen to an unacceptable level of 240 volts (Example 25). The combination of additions tested were somewhat effective but their stabilization was shown to be unsatisfactorily short lived.

Results are shown in Table 3:

TABLE 3

| Properties | Example | | | | |
|---|---|---|---|---|---|
|  | 21 | 22 | 23 | 24 | 25 |
| Fann, 150° F.: | | | | | |
| $V_a$, cps | 30 | 35 | 33 | 55 | 61 |
| $V_p$, cps | 26 | 29 | 28 | 36 | 53 |
| YP, p.c.s.f. | 8 | 12 | 10 | 28 | 16 |
| 10″-10′ gel, p.c.s.f | 3- | 3-4 | 2-3 | 5-8 | 2-5 |
| ES (volts) | 400 | 540 | 480 | 540 | 240 |

EXAMPLES 26-31

A 16 pound per gallon oil base mud was prepared substantially as above. Additives incorporated in the mud during preparation include 1 pound per barrel of disodium N-lauryl-β-aminodipropionate (an additive against lignosulfonate contamination) .7 pound per barrel of napthenic acid, 2.5 pounds per barrel of stearic acid. The mud was contaminated with 3% by volume of a saturated aqueous solution of calcium chloride and with 2% by volume of a chrome lignosulfonate water base mud.

The cocoamine diethoxylate containing water soluble surfactant used in the prior examples was replaced with

TABLE 2

| Samples | Contamination | Before hot-roll tests | | | | | After hot-roll tests | | | | |
|---|---|---|---|---|---|---|---|---|---|---|---|
| | | $V_a$, cps. | $V_p$, cps. | YP, p.c.s.f. | 10″ gel, p.c.s.f. | ES, volts | $V_a$, cps. | $V_p$, cps. | YP, p.c.s.f. | 10″ gel, p.c.s.f. | ES, volts |
| 3.0 p.p.b. nonylphenol monoethoxylate<br>3.0 cocoamine diethoxylate | 12% by vol. sat. CaCl₂ | 74 | 58 | 32 | 10 | >520 | 70 | 57 | 26 | 8 | >520 |
| 3.0 p.p.b. nonylphenol triethoxylate<br>3.0 cocoamine diethoxylate | 12% by vol. sat. CaCl₂ | 55 | 45 | 10 | 5 | 320 | F | L | I | P | O |

EXAMPLES 21-25

An oil base drilling mud sample prepared as above and weighted to 12 pounds per gallon was contaminated with a 3 percent water solution saturated with calcium chloride. The mud was tested, and the electrical stability was found to be somewhat reduced (Example 21). The mud was then contaminated with 3 percent by volume of a lignosulfonate water base mud and 8 pounds per barrel of calcium chloride introduced as a saturated solution of a phthalic acid modified cocoalkanolamide containing 15% by weight sulfonate oleic acid. Accordingly, 1.5 pounds per barrel of this modified alkanolamide and 1.5 pounds per barrel of nonylphenol monoethoxylate were added to the mud.

The mud was tested for initial properties upon preparation (Example 26), and then tested after a hot-roll at 200° F. for 16 hours (Example 27).

The sample was further contaminated with 10.5 pounds per barrel of calcium chloride added as a saturated aqueous solution. Additional treatment to the sample included one additional pound per barrel of each of the modified alkanolamide and the nonylphenol monoethoxylate. The sample was then again tested for rheological properties (Example 28).

This sample was then hot-rolled at 300° F. and tested after 16 hours (Example 29), 32 hours (Example 30), and after 48 hours (Example 31).

In all instances, the additive system maintained electrical stability and rheological properties well within desirable ranges despite the extensive hot-rolling at high temperature.

Results are set forth in Table 4:

TABLE 4

| Example | Fann properties, 150° F. |  |  |  | Observations |  |
|---|---|---|---|---|---|---|
|  | AV, cps. | PV, cps. | YP, p.c.s.f. | 10″ Gel, p.c.s.f. | ES, volts | Appearance |
| 26 | 62 | 52 | 20 | 6 | >520 | Smooth. |
| 27 | 57 | 49 | 16 | 4 | >520 | Do. |
| 28 | 68 | 56 | 24 | 5 | >520 | Do. |
| 29 | 60 | 54 | 12 | 4 | >520 | Do. |
| 30 | 60 | 54 | 12 | 4 | >520 | Do. |
| 31 | 61 | 56 | 10 | 4 | >520 | Do. |

EXAMPLES 32–38

To illustrate the function of the oil-soluble, water-insoluble component of the instant novel additive system, laboratory barrels of unweighted oil base drilling mud were prepared as indicated prior to Example 1.

To the first experimental barrel was added one gram of additive system of this invention, i.e., 0.5 gram nonylphenol monoethoxylate and 0.5 gram of the water-soluble combination of phthalic modified coco-ethanolamide and sulfonated oleic acid in a 85:15 weight ratio. This mud system, called System A was tested for Fann properties at 100° F. (Example 32). A second experimental barrel, called System B was similarly prepared except the nonylphenol monoethoxylate was omitted and 1 gram of the water-soluble components as above were added. System B was also tested for Fann properties at 100° F. (Example 33). Results are shown below:

|  | Example 32 | Example 33 |
|---|---|---|
|  | System A (100° F.) | System B (100° F.) |
| Apparent viscosity, cps | 51 | 61 |
| Plastic viscosity, cps | 37 | 40 |
| Yield point, p.c.s.f | 28 | 42 |
| Gel, 10″–10′, p.c.s.f | 2/6 | 3/20 |

The equivalent of 3 pounds per barrel of the same additive as provided above was admixed with each system. Each system was also weighted to 16 pounds per gallon density with barite and the addition of 5 percent by volume diesel oil. Rheology was tested again at 150° F.

|  | Example 34 | Example 35 |
|---|---|---|
|  | System A (150° F.) | System B (150° F.) |
| Apparent viscosity, cps | 54 | 70 |
| Plastic viscosity, cps | 46 | 53 |
| Yield point, p.c.s.f | 16 | 34 |
| Gel, 10″–10′, p.c.s.f | 5/10 | 9/24 |

The viscosity characteristics of System B in Example 35 were becoming unacceptable in the increase of the yield point which is preferably less than about 20 at a weight of 16 pounds per barrel.

Each system was contaminated with 2 percent by volume chrome lignosulfonate mud and 8 percent by volume of a saturated aqueous solution of calcium chloride. Rheology was checked at 150° F. and each sample was hot-rolled for 16 hours at 300° F. after which rheology was again tested at 150° F.

|  | Examples 36–37 |  | Examples 38–39 |  |
|---|---|---|---|---|
|  | System A |  | System B |  |
|  | Before hot roll | After hot roll | Before hot roll | After hot roll |
| Apparent viscosity, cps | 66 | 67 | 90 | 97 |
| Plastic viscosity, cps | 52 | 56 | 64 | 70 |
| Yield point, p.c.s.f | 28 | 22 | 52 | 54 |
| Gel, 10″–10′, p.c.s.f | 5/12 | 3/6 | 4/34 | 4/25 |

The increase of viscosity of System B was unacceptable. However, by adding 4 grams nonylphenol monoethoxylate to create a 50:50 weight ratio of oil soluble to water-soluble additives rheological properties were restored.

Example 40
System B+4 gr.
nonylphenol monoethoxylate

Apparent viscosity, cps. _____ 58
Plastic viscosity, cps. _____ 54
Yield point, p.c.s.f. _____ 8
Gel, 10″–10′, p.c.s.f. _____ 2/5

EXAMPLE 39

To demonstrate the function of the long chain anionic component in the instant novel additive system, a pair of mud samples was prepared as above and weighted to 16 pounds per barrel with barite. To each sample was then added a combination of phthalic acid modified coco-ethanolamide (without sulfonated oleic acid) combined with nonylphenol monoethoxylate. The combination of these compounds was added as a system in an amount corresponding to 6 pounds per barrel to two samples in a 50:50 weight ratio and a 75:25 alkanolamide:phenol ratio. Each sample was contaminated with 12% by volume of a saturated aqueous calcium chloride solution. Both samples flipped immediately indicating this additive was not satisfactory.

EXAMPLES 40–43

Four sample barrels of mud were prepared as above and weighted with barite to 16 pounds per barrel. To each system was added the equivalent of 3 pounds per barrel of an additive system constituted as follows:

|  | Example |  |  |  |
|---|---|---|---|---|
|  | 40 | 41 | 42 | 43 |
|  | Pounds per barrel |  |  |  |
| Phthalic mod.-cocoalkanolamide | 1.27 | .75 |  | .64 |
| Sulfonated oleic acid | .23 | .75 | 1.5 | .11 |
| Nonylphenol monoethoxylate | 1.5 | 1.5 | 1.5 | 2.25 |

All samples were contaminated with 8.7% by volume of a saturated calcium chloride solution and an additional amount of calcium chloride corresponding to 9 pounds per barrel.

Each sample was hot-rolled at 300° F. for 16 hours and tested for rheological properties. This procedure was repeated and the data appears below:

|  | Example |  |  |  |
|---|---|---|---|---|
|  | 40 | 41 | 42 | 43 |
| First hot roll: |  |  |  |  |
| $V_a$ (cps.) | 80 | 89 | 93 | 75 |
| $V_p$ (cps.) | 67 | 74 | 76 | 63 |
| YP (p.c.s.f.) | 26 | 30 | 34 | 24 |
| 10″ gel (p.c.s.f.) | 4 | 10 | 12 | 5 |
| Second hot roll: |  |  |  |  |
| $V_a$ (cps.) | 74 | 90 | 96 | 85 |
| $V_p$ (cps.) | 64 | 75 | 77 | 75 |
| YP (p.c.s.f.) | 20 | 30 | 38 | 20 |
| 10″ gel (p.c.s.f.) | 4 | 8 | 14 | 7 |

It will be noted from the data above that as the amount of sulfonated oleic acid increases going from Example 40 to Example 42, the yield point increases steadily to an unsatisfactory level. Generally the viscosity and gel strength of the system increases undesirably when it should decrease or thin out after high temperature treatment. Examples 43 shows a system according to this invention containing a major amount of oil-soluble phenol and only 25% by weight of the combined water-soluble components. The properties are marginally acceptable though they show an undesirable tendency to increase viscosity and gel after prolonged heat treatment of the 16 p.p.g. mud. In less dense mud, it is likely that the formulation of Example 43 would be acceptable.

The instant invention provides a novel additive system which stabilizes the oil base well fluids, including those fluids containing a substantial amount of water-wettable solids, from a variety of contamination, and in particular from contamination with calcium salts at high temperature, which additive system comprises a combination of two water-soluble surfactants, an aromatically modified alkanolamide anionic surfactant and a polyfunctional sulfonated anionic surfactant with a water-in-soluble, oil-soluble ethoxylated alkyl phenol.

What is claimed is:

1. An oil base fluid suitable for use in oil and gas wells under borehole conditions wherein contamination is encountered, which comprises a continuous oil phase containing oil wet weight material supported in said fluid, a discontinuous water phase, and a minor stabilizing amount of an additive system consisting essentially of
from about 25 to 85 percent by weight based upon the weight of said system of a water soluble portion consisting essentially of
10 to 20 parts by weight of a water-soluble condensation product of a mononuclear aromatic polycarboxylic acid or anhydride with a fatty acid lower-alkanolamide, the fatty acid portion of which contains about 8 to 24 carbon atoms, and
1 to 5 parts by weight of a sulfonated long chain fatty acid or alcohol, and
from about 15 to 75 percent by weight based upon the weight of said system of an oil-soluble portion consisting essentially of a water-insoluble ethoxylated alkyl phenol.

2. The oil base fluid of claim 1 wherein said alkanolamide portion of said water-soluble condensation product is a fatty acid ethanolamide.

3. The oil base fluid of claim 1 wherein said aromatic compound is phthalic acid or phthalic anhydrides.

4. The oil base fluid of claim 1 wherein said alkyl phenol corresponds to the formula:

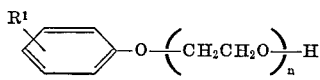

wherein $R^1$ is alkyl and $n$ indicates a number of repeating ethyleneoxy groups insufficient to render the compound water soluble.

5. The oil base fluid of claim 4 wherein $R^1$ is octyl or nonyl.

6. The oil base fluid of claim 5 wherein said sulfonated compound is sulfonated oleic acid.

7. An oil base well fluid suitable for use under borehole conditions comprising a continuous oil phase containing oil-wet weighting material, a discontinuous water phase, and a small amount sufficient to maintain fluid integrity of an additive system consisting essentially of about 15 to 75 percent by weight based on said system of a water-insoluble portion consisting essentially of ethoxylated alkyl phenol having an average of from about 1 to 2 ethyleneoxy groups per molecule and about 25 to 85 percent by weight based on said system of a water-soluble portion consisting essentially of 10 to 20 parts by weight of a condensation product of phthalic acid or phthalic anhydride with a fatty acid ethanolamide the fatty acid portion of which has from about 8 to 24 carbon atoms, and from 1 to 5 parts by weight of a sulfonated long chain fatty acid.

8. The oil base fluid or claim 7 wherein said additive system is present in an amount of from about 2 to about 8 pounds per barrel.

9. The oil base fluid of claim 8 wherein said oil phase contains blown asphalt.

10. An additive system for stabilizing an off continuous-phase drilling fluid against loss of rheological properties and emulsion integrity which consists essentially of from about 15 to about 60 percent by weight of a water-insoluble portion consisting essentially of an alkyl phenol of the formula:

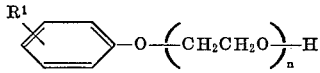

wherein $R^1$ is alkyl and $n$ is a number between about 1 and 2 indicating average number of ethyleneoxy groups and from about 40 to 85 percent by weight of a water-soluble portion consisting essentially of about 10 to 20 parts by weight of a condensation product of a mononuclear aromatic polycarboxylic acid and a fatty acid lower-alkanolamide, the fatty acid portion of which has about 8 to 24 carbon atoms, and from about 1 to 5 parts by weight of a sulfonated long chain fatty acid or fatty alcohol having about 12 to 24 carbon atoms.

11. The additive system of claim 10 wherein said water-soluble condensation product is a condensation product of phthalic acid or phthalic anhydride with a fatty acid ethanolamide.

12. The additive system of claim 10 wherein said $R^1$ is octyl or nonyl and said water-soluble condensation product is a condensation product of phthalic acid or phthalic anhydride with coco acid ethanolamide.

13. The additive system of claim 10 wherein said water-soluble sulfonated compound comprises a $C_{18}$ fatty acid or alcohol.

14. The additive system of claim 13 wherein said sulfonated compound comprises sulfonated oleic acid.

15. A method of treating an oil base fluid containing weighting materials for use in an oil or gas well under conditions where contamination with a water-soluble calcium salt is encountered, which comprises adding to said fluid a small amount, sufficient to maintain the emulsion integrity of said fliud, of an additive system which consists essentially of from about 15 to about 60 percent by weight of a water-insoluble portion consisting essentially of an alkyl phenol of the formula:

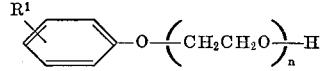

wherein $R^1$ is an alkyl and $n$ is a number between about 1 and 2 indicating average number of ethyleneoxy groups and from about 40 to 85 percent by weight of a water-soluble portion consisting essentially of 10 to 20 parts by weight of a condensation product of a mononuclear aromatic polycarboxylic acid and a fatty acid lower-alkanolamide, the fatty acid portion of which has about 8 to 24 carbon atoms, and from about 1 to 5 parts of a sulfonated long chain fatty acid or alcohol.

16. The method of claim 15 wherein said water-soluble condensation product is a condensation product of phthalic acid or phthalic anhydride with a fatty acid ethanolamide.

17. The method of claim 15 wherein said $R^1$ is octyl or nonyl and said water-soluble condensation product is a condensation product of phthalic acid or phthalic anhydride with coco acid ethanolamide.

18. The method of claim 15 including the additional step of post-treating a previously treated oil base drilling fluid for contamination resulting in water wetting of solids by adding thereto sufficient amounts of said condensation product and said sulfonated compound to render said solids oil-wet but insufficient to decrease the relative amount of said ethoxylated alkyl phenol to less than 15 percent by weight based upon the total weight of the additives of such additive system.

19. A method of restoring water-in-oil emulsion integrity to an oil base drilling fluid exposed to contamination with water-soluble calcium salts in a borehole which comprises adding to said fluid, while circulating said fluid through said borehole, from 2 to about 20 pounds per barrel of fluid of an additive system consisting essentially of from about 15 to about 60 percent by weight of a water-insoluble ethoxylated alkyl phenol having an average of from about 1 to 2 ethyleneoxy groups per molecule, and from about 40 to about 85 percent by weight of a water-soluble portion consisting essentially of 10 to 20 parts by weight of a water-soluble condensation product of phthalic acid or phthalic anhydride with a fatty acid ethanolamide and from about 1 to 5 parts by weight of a water-soluble sulfonate fatty acid or fatty alcohol containing from 12 to about 25 carbon atoms.

References Cited
UNITED STATES PATENTS

| | | | |
|---|---|---|---|
| 2,661,334 | 12/1953 | Lummus | 252—8.5 P |
| 2,885,358 | 5/1959 | Reddie | 252—8.5 P |
| 3,099,624 | 7/1963 | Wilson | 22—8. M |
| 3,125,517 | 3/1964 | Voda | 252—8.5 |
| 3,223,622 | 12/1965 | Lummus et al. | 252—8.5 P |

LEON D. ROSDOL, Primary Examiner

H. A. PITLICK, Assistant Examiner

U.S. Cl. X.R.

175—65; 252—8.5 P, 255, 357